United States Patent [19]

Lillis et al.

[11] 3,998,914

[45] Dec. 21, 1976

[54] FILM FROM A BLEND OF HIGH DENSITY POLYETHYLENE AND A LOW DENSITY ETHYLENE POLYMER

[75] Inventors: Rupert Martin Lillis, Mount Chesney; Carmen Van Thomas, Beaconsfield, both of Canada

[73] Assignee: Du Pont of Canada, Ltd., Montreal, Canada

[22] Filed: Sept. 24, 1974

[21] Appl. No.: 508,889

Related U.S. Application Data

[63] Continuation of Ser. No. 324,372, Jan. 17, 1973, abandoned.

[30] Foreign Application Priority Data

Feb. 1, 1972 Canada .............................. 133717

[52] U.S. Cl. .............................. 260/897 A; 264/289
[51] Int. Cl.² .................. C08L 23/06; C08L 23/08
[58] Field of Search ..................................... 260/897

[56] References Cited

UNITED STATES PATENTS

| | | | |
|---|---|---|---|
| 2,983,704 | 5/1961 | Roedel | 260/897 |
| 3,176,051 | 3/1965 | Gregorian et al. | 260/897 |
| 3,176,052 | 3/1965 | Peticolas | 260/897 |
| 3,231,686 | 1/1966 | Snyder et al. | 260/897 |
| 3,299,194 | 1/1967 | Golike | 260/897 |
| 3,509,116 | 4/1970 | Cote et al. | 260/897 |

*Primary Examiner*—Carman J. Seccuro

[57] ABSTRACT

High density polyethylene film of improved clarity and stiffness is disclosed. The improved high density polyethylene film may be manufactured from a blend of polymers comprising an ethylene polymer of density in the range about 0.950–0.965 and of melt index less than about 10, and not more than about 30% of an ethylene polymer of melt index in the range of about 0.1 to about 10 and of density in the range about 0.910–0.945.

18 Claims, No Drawings

FILM FROM A BLEND OF HIGH DENSITY POLYETHYLENE AND A LOW DENSITY ETHYLENE POLYMER

This is a continuation of Ser. No. 324,372, filed Jan. 17, 1973, now abandoned.

This invention relates to a process for the manufacture of polyolefin film of improved optical and stiffness properties and in particular, this invention relates to film manufactured from high density polyethylenes, such polyethylenes being of density about 0.950–0.965. Preferably, the polyethylenes are narrow molecular weight distribution high density ethylene polymers blended with a minor amount of either an ethylene homopolymer or a copolymer of ethylene and a higher molecular weight α-olefin.

The manufacture of film from homopolymers and copolymers of ethylene of densities in the range of about 0.910 to 0.940 is well known. These films have a wide variety of end uses such as, for example, in the packaging of food, fertilizers, peat moss, hardware and chemicals and as a barrier in the construction industry and in greenhouses. Films derived from polyethylenes of densities in the range 0.910–0.940 are referred to as low to medium density polyethylene films and such films generally tend to have acceptable optical properties, flexibility and heat sealability.

Polypropylene films, and especially biaxially oriented polypropylene films, which are also widely used for packaging purposes, usually have good optical and stiffness properties. For example, oriented polypropylene films may have a haze of about 2% and a stiffness of greater than 400,000 pounds per square inch, the measurement of haze and stiffness being described hereinafter. Polyethylene films exhibiting a similar combination of optical and stiffness properties are not commercially available.

The manufacture of film from linear ethylene polymers has been disclosed, for example, in U.S. Pat. No. 2,862,917, which issued to A. W. Anderson, E. L. Fallwell and J. M. Bruce on December 2, 1958. The linear ethylene polymers described in this Anderson et al. patent typically have densities of about 0.955–0.965. The manufacture of film from polyethylene having a density of at least 0.94 is disclosed in Canadian Patent 685,170 of R. Doyle which issued on April 28, 1964.

Blends of a high density polyethylene (density 0.940–0.970) with 0.1 to 10% of an ethylene homopolymer or of an ethylene-butene-1 copolymer to improve optical clarity have been disclosed in U.S. Pat. No. 3,176,051 to R. S. Gregorian et al. which issued on March 30, 1965. The polymers blended into the high density polyethylenes are characterized in terms of reduced viscosity as the molecular weight of these polymers is so high that melt index measurements above 0.0 are not obtainable. Melt index is a measure of melt viscosity and is obtained using ASTM method D-1238.

It has now been found that film having improved optical and stiffness properties may be obtained from a polymer blend comprising a high density polyethylene blended with a polyethylene of melt index of at least 0.1. In particular, it has been found that a high density polyethylene film of improved optical and stiffness properties may be obtained from a narrow molecular weight distribution high density polyethylene blended with a minor amount of either a broad molecular weight distribution ethylene homopolymer of similar density, a polyethylene of different density, or a narrow or broad molecular weight distribution ethylene-butene-1 copolymer.

Accordingly, the present invention provides high density polyethylene film of improved clarity and stiffness, said polyethylene film being manufactured from a blend of polymers comprising an ethylene polymer of density in the range about 0.950–0.965 and of melt index less than about 10 and not more than about 30% of an ethylene polymer of melt index in the range of about 0.1 to about 10 and of density in the range about 0.910–0.945.

In a preferred embodiment, the present invention provides high density polyethylene film of improved clarity and stiffness, said polyethylene film being manufactured from a blend of ethylene polymers comprising an ethylene polymer of density in the range about 0.950–0.965 and of melt index less than about 10 and 5 to 30% (preferably, 10 to 25%) of an ethylene polymer of melt index in the range of about 10 to about 0.1 selected from the group consisting of an ethylene homopolymer of density in the range about 0.910–0.945 and ethylene-butene-1 copolymer of density about 0.910–0.945.

In a further embodiment, the present invention provides high density polyethylene film of improved clarity and stiffness manufactured from a narrow molecular weight distribution ethylene polymer of density in the range about 0.950–0.965 blended with either an ethylene homopolymer of density about 0.910–0.945 or an ethylene-butene-1 copolymer of density about 0.910–0.945.

In particular, the present invention provides a high density polyethylene film having a haze of less than 15% and especially below 10%, and in a preferred embodiment a haze of less than 5%.

In another embodiment, the high density polyethylene film of improved clarity may be oriented and such oriented films may have a stiffness, as measured by tensile modulus of elasticity, which is described hereinafter, of more than 200,000 pounds per square inch (psi).

The properties of polyolefins and in particular the properties of ethylene polymers may be characterized in a number of ways including melt index, density and molecular weight. While the weight or number average molecular weight is of prime importance in determining polymer properties, the molecular weight distribution of the polyethylene chains may also be a significant factor in determining the polymer properties.

The molecular weight distribution may be defined conveniently in terms of the stress exponent of the polymer. Stress exponent is discussed in U.S. Pat. No. 2,993,882 which issued July 25, 1961 to C. E. Ashby, S. P. Foster and E. T. Pieski and in U.S. Pat. No. 3,380,978 which issued April 30, 1968 to D. J. Ryan and B. J. Starkey. The stress exponent is determined by measuring the throughput of a melt indexer at two stresses (2160 and 6280g loading) using the procedures of the ASTM melt index test method D-1238. The stress exponent is calculated using the formula:

$$\text{Stress exponent} = \frac{1}{0.477}\left(\log \frac{\text{wt. extruded with 6480 g wt.}}{\text{wt. extruded with 2160 g wt.}}\right)$$

The stress exponent of a polymer is a measure of melt viscosity and is not a direct measure of molecular weight distribution. Stress exponent may be a function of polymer molecular weight and it is preferred that the stress exponent values of different polymers be measured at similar levels of molecular weight or melt index whenever possible. A suitable melt index for the measurement of stress exponent of film grade polymers is 1.0.

Very narrow molecular weight distribution polyethylenes are characterized by low stress exponent values such as about 1.30 or less for polymers of melt index of about 1.0. Similarly, very broad molecular weight distribution polymers are characterized by stress exponent values above about 1.8. In the present application, all polymers of stress exponent less than about 1.4 have been classed as narrow molecular weight distribution polymers and all polymers of stress exponent above about 1.4 have been classed as broad molecular weight distribution polymers. However, it should be noted that the change from narrow to broad molecular weight distributions is not abrupt but rather a continuous spectrum of molecular weight distributions may exist between polymers classed as being of narrow or of broad molecular weight distribution.

The polymer comprising not less than about 70% of the polymer blend is hereinafter referred to as the base polymer. According to the present invention, the base polymer is an ethylene polymer of density about 0.950–0.965. This polymer may be of either broad or narrow molecular weight distribution, although in the preferred embodiment the polymer is of narrow molecular weight distribution. The polymer must be capable of being made into film; suitable polymers have a melt index in the range about 0.1–10.0. The polymer may be a homopolymer of ethylene or the polymer may contain a minor amount of a comonomer such as butene-1, the amount of comonomer not being in excess of the amount required to lower the polymer density below about 0.950.

The polymer blended into the base polymer may be an ethylene polymer of density in the range about 0.910–0.945, preferably 0.930–0.945, and may be of either broad or narrow molecular weight distribution. The melt index of this polymer is preferably in the range 0.1 to 10. In particular, the ethylene polymer may be a homopolymer of ethylene.

Alternatively, the polymer blended into the base polymer may be an ethylene-butene-1 copolymer of density about 0.910–0.945, of melt index in the range 0.1 to 10 and preferably having a narrow molecular weight distribution. In a preferred embodiment, the copolymer may have a density in the range about 0.930–0.945.

Processes for the manufacture of such polymers are known and may include free radical, coordination catalyst or solid catalyst polymerization processes.

Techniques for the blending of the polymers are also known. For example, the polymers may be blended by physically blending the polymers in the form of pellets, or the polymers may be melt blended prior to use or the polymers may be fed separately into the film extruder in the form of pellets or in a molten state, and blended in the extruder.

Film of improved optical properties may be manufactured from the blended polymers by known techniques. These processes include flat sheet extrusion techniques, such as water quench or cold roll quench processes, and blown film processes with or without internal and/or external cooling. Preferred techniques are those disclosed in Canadian Patent 579,650 which issued to G. B. Dyer and W. P. Heinstein on July 14, 1959 and in copending Canadian application 038,315 of M. Bunga and C. V. Thomas filed December 19, 1968. The optical properties of the film may depend on the process used in the manufacture of the film; the preferred techniques employ rapid cooling of the film immediately after extrusion.

The melt index of the base polymer, and of the polymer blended into the base polymer has been stated to be less than about 10 for the process of the present invention. This upper level of melt index for the polymers is not a critical feature of the invention except for the requirement that the blend of polymers must be capable of being made into film. The upper level of melt index is governed primarily by the technique used in the manufacture of film from the blended polymer. For example, flat film extrusion processes may be operable using polymers of higher melt index than may be used in a blown film process. Such melt index requirements are known.

As illustrated in the examples hereinafter, it has been found that high density polyethylene film of improved clarity and higher stiffness may be obtained by the process of the present invention.

A further improvement in the optical clarity and stiffness of the film may be obtained by orientation of the blended film. Such orientation may be uniaxial especially in the machine direction, i.e., the direction of extrusion of the film, or biaxial such as obtained by the use of a tenter frame. In a preferred embodiment, the film may be uniaxially oriented by at least a ratio of about 6:1, or more, in the machine direction. Orientation may not only result in a further improvement in optical clarity but may yield a film having a tensile modulus of elasticity greater than 200,000 psi. In a preferred embodiment the film may be characterized by a tensile modulus of elasticity of greater than 200,000 psi and by a haze of less than 5%.

The invention is further illustrated by the following examples.

To ascertain the film properties of unblended polymers, film was manufactured from the polymers listed in Table I using the process described in Canadian application 038,315 referred to hereinabove. The 3.5 inch extruder was operated at a speed of 100 lb./hour and with a die temperature in the range 245° to 260° C. in all cases. A metering screw was used in the extruder.

The properties of the film obtained are given in Table II. The haze was measured by ASTM method D-1003-59, the gloss by ASTM method D-523-53T and the stiffness as described by the tensile modulus of elasticity by ASTM method D-882-64T.

The film thickness in all cases was 1.0 mil.

EXAMPLE I

SCLAIR* 19×6 polymers in pellet form was physically blended with another polymer also in pellet form and fed to a film extruder. The extruder was operated in the manner outlined above.

* Registered trademark of Du Pont of Canada for its olefin polymers

The polymer blends and properties of the film produced are given in Table III.

EXAMPLE II

To show the effect of orientation, 6 mil film manufactured from blended polymer was monoaxially oriented in the machine direction. Orientation was carried out at a film wind-up speed of 35 fpm using a hot roll temperature of 135° C., a cold roll temperature of 90° C. and an orientation gap of 0.010 inches.

The properties of the 1 mil film produced are given in Table IV.

TABLE I

| Polymer Type* | Polymer Properties | | |
| --- | --- | --- | --- |
| | Density | Melt Index | Stress Exponent |
| SCLAIR 19×6 | 0.955 | 1.1 | 1.30 |
| SCLAIR 59C | 0.960 | 0.46 | 1.76 |
| SCLAIR 14B | 0.935 | 2.0 | 1.35 |
| ALATHON 4476 | 0.933 | 2.0 | 1.55 |

*SCLAIR is the registered trademark of Du Pont of Canada Limited for its polyolefin polymers. SCLAIR 14B is an ethylene-butene-1 polymer, all other SCLAIR polymers in Table I are ethylene polymers.
ALATHON is the registered trademark of E.I. du Pont de Nemours Inc. for its ethylene polymers.

TABLE II

| | Film Properties | | | | | | |
| --- | --- | --- | --- | --- | --- | --- | --- |
| | | | | Tensile Modulus of Elasticity* | | | |
| Polymer Type | Film Density | Haze (%) | Average Gloss (%) | MD | TD | Melt Index | Stress Exponent |
| SCLAIR 19×6 | 0.935 | 5.5 | 105 | 87 | 110 | 1.0 | 1.30 |
| SCLAIR 59C | 0.943 | 81 | 0 | 110 | 164 | 0.46 | 1.76 |
| SCLAIR 14B | 0.925 | 2.5 | 140 | 55 | 62 | 1.85 | 1.30 |

*Tensile Modulus of Elasticity results are in psi × $10^{-3}$

TABLE III

| | | | | Properties of Film from Blended Polymers | | | | |
| --- | --- | --- | --- | --- | --- | --- | --- | --- |
| Base Polymer* | | Added Polymer* | | Film Density | Haze (%) | Tensile Modulus of Elasticity** | | Average Gloss (%) |
| | | | | | | MD | TD | |
| SCLAIR 19×6 | (85%) | ALATHON 4476 | (15%) | 0.935 | 4.8 | 82 | 104 | 105 |
| SCLAIR 19×6 | (75%) | ALATHON 4476 | (25%) | 0.932 | 3.3 | 82 | 78 | 110 |
| SCLAIR 19×6 | (85%) | SCLAIR 14B | (15%) | 0.933 | 4.7 | 88 | 110 | 96 |
| SCLAIR 19×6 | (75%) | SCLAIR 14B | (25%) | 0.931 | 4.0 | 72 | 96 | 100 |
| SCLAIR 59C | (85%) | ALATHON 4476 | (15%) | 0.944 | 14.4 | 98 | 131 | 20 |

*The percentages in brackets are the proportion by weight in the final blend.
**in psi × $10^{-3}$

TABLE IV

| | | Film From Blended Polymer/Effect of Orientation | | | | | |
| --- | --- | --- | --- | --- | --- | --- | --- |
| Polymer Type | | Orientation Ratio | Gauge (mil) | Film Density | Haze (%) | Average Gloss (%) | Tensile Modulus of Elasticity* |
| | | | | | | | MD  TD |
| Blend of SCLAIR 19×6 ALATHON 4476 | (85%) (15%) | 6:1 | 1.0 | 0.948 | 3.4 | 94 | 263  220 |

*in psi × $10^{-3}$

I claim:
1. High density polyethylene film of improved clarity and stiffness exhibiting a haze below about 10 percent, said polyethylene film being manufactured from a blend of polymers comprising (1) a high density ethylene homopolymer of density in the range about 0.950–0.965, of melt index less than about 10, and a stress exponent value less than 1.4, and (2) about 5 to 30% of a low density ethylene polymer of melt index in the range of about 0.1 to about 10 and of density in the range about 0.910–0.945, said low density ethylene polymer being an ethylene homopolymer having a stress exponent value greater than 1.4 or an ethylene-butene-1 copolymer containing a minor amount of butene-1.

2. The high density polyethylene film of claim 1 wherein the polymer of density in the range 0.950–0.965 has a melt index of at least 0.1.

3. The high density polyethylene film of claim 2 wherein the ethylene polymer of density in the range 0.950–0.965 is blended with not more than 30% of an ethylene homopolymer of density about 0.910–0.945.

4. The high density polyethylene film of claim 3 wherein the ethylene polymer of density 0.950–0.965 is blended with about 5–30% of an ethylene homopolymer of density about 0.930–0.945.

5. The high density polyethylene film of claim 3 wherein the ethylene polymer of density 0.950–0.965 is blended with about 10–25% of an ethylene homopolymer of density about 0.930–0.945.

6. The high density polyethylene film of claim 3 whenever oriented.

7. The high density polyethylene film of claim 3 whenever uniaxially oriented by a ratio of at least about 6:1.

8. The high density polyethylene film of claim 3 whenever oriented such that the tensile modulus of elasticity of the oriented film is greater than about 200,000 pounds per square inch.

9. The high density polyethylene film of claim 3 whenever characterized by a haze of less than 5%.

10. The high density polyethylene film of claim 3 whenever oriented such that the oriented film is characterized by a tensile modulus of elasticity greater than about 200,000 pounds per square inch and a haze of less than 5%.

11. The high density polyethylene film of claim 2 wherein the low density ethylene polymer is an ethylene-butene-1 copolymer containing a minor amount of butene-1.

12. The high density polyethylene film of claim 11 wherein the ethylene-butene-1 copolymer is of density about 0.930–0.945.

13. The high density polyethylene film of claim 11 wherein the ethylene polymer is blended with 10–25% of the ethylene-butene-1 copolymer of density about 0.930–0.945.

14. The high density polyethylene film of claim 11 whenever oriented.

15. The high density polyethylene film of claim 11 whenever uniaxially oriented by a ratio of at least about 6:1.

16. The high density polyethylene film of claim 11 whenever oriented such that the tensile modulus of elasticity of the oriented film is greater than about 200,000 pounds per square inch.

17. The high density polyethylene film of claim 11 whenever characterized by a haze of less than 5%.

18. The high density polyethylene film of claim 11 whenever oriented such that the oriented film is characterized by a tensile modulus of elasticity of greater than about 200,000 pounds per square inch and a haze of less than 5%.

* * * * *